United States Patent Office 3,337,122
Patented Aug. 22, 1967

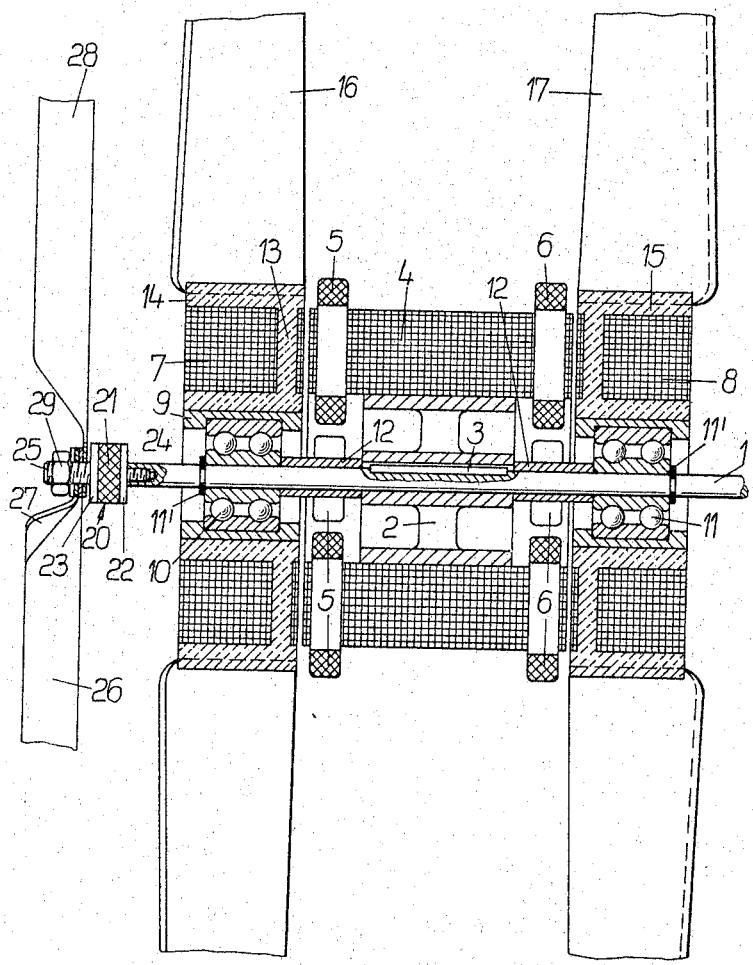

3,337,122
AXIAL BLOWERS
Johann Gross, Andernach, Rhine, Germany, assignor to Blech-und Metallwarenfabrik Robert Fischbach K.G., Neunkirchen Kreis, Siegen, Germany
Filed Nov. 8, 1965, Ser. No. 506,800
Claims priority, application Germany, Nov. 11, 1964, B 79,274
5 Claims. (Cl. 230—117)

ABSTRACT OF THE DISCLOSURE

An axial blower with two axial impellers mounted in series one behind the other operable by two disc armature motors having rotors connected to the impellers. The motors have a stator package mounted on a shaft and between the impellers.

---

The invention relates to axial blowers, and more especially to axial blowers comprising two contrarotating axial rotors mounted in series.

Such blowers have the advantage that a guide wheel between the rotors is unnecessary and that the pressure obtained corresponds at least to that of a two-stage blower. Very short axial size is assured moreover by the elimination of the guide wheel.

Blowers of this known kind are only infrequently employed in practice despite their great advantages, because difficulties are encountered in providing a drive for the two contrarotating axial rotors. To provide the contrarotation of the two rotors, either two separate motors are mounted on the sides of the rotors facing away from each other, or one motor is employed with two projecting shaft stubs. One rotor is then driven by one shaft stub, and the other rotor by the other shaft stub through a reversing gear. Both these constructions require considerable space however, and are costly. The use of a single motor moreover has the drawback that the speed of revolution of the rotors cannot be regulated independently of each other, unless the reversing gear is constructed to act as an infinitely variable gear, which increases the cost of the drive considerably.

A main object of the invention is to create a driving system for axial blowers with contrarotating rotors, which avoids the shortcomings of the known driving systems.

According to the invention the axial blower comprises two axial impellers mounted in series, two disc armature motors having rotors respectively connected to the impellers so as to drive the impellers, each impeller having blades fastened on the periphery of the rotor of its driving motor, a stationary shaft traversing the stators of the motors on which shaft the rotors of both motors are rotatably mounted for contrarotation, the stators being mounted side-by-side on said shaft and between the empellers.

Preferably the stators of both disc armature motors have a shared core sheet package which is slotted at both ends for reception of the stator windings.

The stationary shaft, which is solid, may have its ends secured in the blower casing. It is also possible however to fasten the shaft within the casing by means of the core sheet package of the stators.

The blades of the axial impellers are fastened on the rotors themselves. This may advantageously be accomplished in such manner that during the conventional production of the short-circuit winding, the blades are jointly cast-in with the outer short-circuiting rings or discs, or are produced together with the short-circuit windings by casting or injection.

Disc armature motors have the advantage of very short structural length, so that the desirable short spacing between the two impellers may be obtained despite the positioning of the stators between the axial impellers. The two stator windings may be connected to a supply circuit in such manner as to establish the contrarotation of the impellers without any difficulty.

The speed of revolution of the one rotor may moreover be varied easily by varying the voltage fed to the corresponding stator. In a blower, the required torque drops quadratically as the speed of revolution decreases, so that variation of the speed of revolution may be accomplished by voltage variation even in the case in which short-circuit or squirrel cage motors are employed. Voltage variation may be accomplished in different ways, either by employing a split or tapped transformer, or by appropriate tappings on the stator windings, or finally by series connection of resistances in the case of small blowers.

Further according to the invention a blower may include rubber/metal connectors fixed to the ends of the stationary shaft, and support spiders fixed to the blower casing, the connectors being fixed to the support spiders. This advantageous and simple way of fastening can be applied because the shaft is stationary. Satisfactory acoustical damping is assured by the rubber/metal units so that a blower according to the invention operates very quietly.

The limbs of the spiders are advantageously constructed in the form of guide vanes. In this case, the spiders perform two functions; firstly, they secure the blower in its casing; and secondly they act as guide vanes which guide the inflowing stream of air correctly to the impellers.

In order that the invention may be more clearly understood an embodiment thereof will now be described, by way of example, with reference to the accompanying drawing, which shows a longitudinal section through an axial blower according to the invention.

In the drawing, 1 indicates a stationary shaft which has both ends fixed to the casing of the axial blower, which casing is not illustrated. The shaft 1 carries a sleeve 2 which is fixed to the shaft 1 by means of a key 3 so that it cannot rotate relative to the shaft. This sleeve 2 carries the shared stator coil 4 of two disc armature motors, and is coiled of sheet metal strip and is slotted at both end sides. These slots receive windings 5 and 6 of both motors.

The rotors of the motors are marked 7 and 8. Each rotor equally consists of a coiled sheet metal package, which is slotted. The core-sheet packages are mounted on sleeves 9 which are rotatably mounted on the stationary shaft 1 by means of ball bearings 10 and 11. The bearings 11 are axially positioned by circular clips 11' and spacing washers 12 relative to the stator package 4 in such manner as to leave a desired gap between the rotors.

A short-circuit or squirrel cage winding system, whose rods are marked 13 and whose short-circuiting rings are marked 14 and 15, are cast in the slots of the rotors 7 and 8. The blades 16, 17 of the two axial impellers are cast-in into the outer short-circuiting rings 14. These blades are of a known construction. The windings 5 and 6 are connected to the supply circuit in such a way that there is phase inversion of the supply to one set of windings relative to the others, so that the blades 16 and 17 revolve in opposite directions.

The blades may alternatively be produced by casting, or they may equally be screwed on to the corresponding rotor. Another very advantageous method for fastening sheet metal blades in the short-circuiting rings of the rotors is to solder or braze the blades formed of sheet metal into preformed oblique slots of the short-circuiting rings.

The fastening of the motor to the casing of the blower is shown at the left-hand end of the shaft 1. The fastening device employed is a rubber/metal connector indicated generally at 20, which comprises a rubber element 21 and metal discs 22 and 23 bonded to the rubber element by vulcanisation. The metal disc 22 carries a threaded pin 24 screwed into the shaft 1. A threaded pin 25 on which the limbs of a support spider are fitted, is fastened on the terminal disc 23. Three limbs 26, 27 and 28 of the spider are indicated in the drawings. These limbs are pressed against the disc 23 by a nut 29. The outer ends of the supporting limbs 26, 27 and 28 are secured to the casing of the blower. This fastening is not illustrated. The limbs may further be constructed in the form of guide vanes, which impart the correct twist to the airstream for entry into the impeller.

I claim:

1. An axial blower comprising two axial impellers mounted in series one behind the other, two disc armature motors having rotors respectively connected to the impellers to drive the impellers, a stator package for the motors, such impeller having blades secured on the periphery of the rotor of its motor, a stationary shaft traversing the stator of the motors on which shaft the rotors of both motors are rotatably mounted for counter-rotation, the stator package being mounted on said shaft and between the impellers, and the windings of the stator of both motors having a shared core-sheet package slotted at both ends for reception of the stator windings.

2. An axial blower according to claim 1, in which a support spider is provided for the stationary shaft, and in which a rubber element and metal plates one on each side of the rubber element are provided to mount the stationary shaft.

3. An axial blower according to claim 1, wherein the inner ends of the blades of the impellers secured into externally provided short-circuiting rings of short-circuit windings of the rotors as a part of the core-sheet package.

4. An axial blower according to claim 1, wherein the blades are produced conjointly with short-circuit windings of the rotors as a one piece construction.

5. An axial blower according to claim 1, wherein the blades are inserted and secured in slots in short-circuiting rings.

References Cited

UNITED STATES PATENTS

| | | | |
|---|---|---|---|
| 2,031,688 | 2/1936 | Bowen | 103—87 |
| 2,830,752 | 4/1958 | Wentling | 230—117 |

FOREIGN PATENTS

| | | |
|---|---|---|
| 648,153 | 9/1962 | Canada. |
| 596,510 | 1/1948 | Great Britain. |

ROBERT M. WALKER, *Primary Examiner.*